United States Patent [19]

Horton

[11] Patent Number: 5,277,216
[45] Date of Patent: Jan. 11, 1994

[54] METHOD OF ATTACHING A VALVE DISC TO A DRIVE SHAFT

[75] Inventor: Norman Horton, Telford, England

[73] Assignee: BTR plc, a British Company, United Kingdom

[21] Appl. No.: 808,920

[22] Filed: Dec. 18, 1991

[30] Foreign Application Priority Data

Jan. 4, 1991 [GB] United Kingdom ................. 9100109

[51] Int. Cl.⁵ ........................... F16K 1/22; F16K 1/48
[52] U.S. Cl. .................................... 137/15; 29/890.13;
29/890.132; 137/315; 251/308; 403/356
[58] Field of Search ................... 137/15, 315; 251/305,
251/308; 403/355, 356; 29/890.13, 890.132, 465

[56] References Cited

U.S. PATENT DOCUMENTS

| | | | |
|---|---|---|---|
| 1,841,695 | 1/1932 | Anderson | 251/308 |
| 2,069,153 | 1/1937 | Konkle | 29/890.13 |
| 2,105,343 | 1/1938 | Briggs | 251/308 |
| 2,937,042 | 5/1960 | Wilder, Jr. | 403/356 |
| 3,191,976 | 6/1965 | Arnts et al. | 403/356 |
| 3,228,262 | 1/1966 | Bennett | 29/465 |
| 3,345,033 | 10/1967 | Fawkes | 251/308 |
| 3,830,577 | 8/1974 | Rampe et al. | 403/356 |
| 3,993,227 | 11/1976 | Oettinger | 403/356 |
| 4,057,217 | 11/1977 | MacDonald | 251/308 |
| 4,225,114 | 9/1980 | Barthelemy et al. | 251/308 |
| 4,241,897 | 12/1980 | Maezawa | |
| 4,611,374 | 9/1986 | Schnelle et al. | 29/890.13 |
| 4,802,783 | 2/1989 | Erikson | 403/2 |
| 4,828,221 | 5/1989 | Scobie et al. | 251/308 |

FOREIGN PATENT DOCUMENTS

| | | |
|---|---|---|
| 1263426 | 3/1968 | Fed. Rep. of Germany . |
| 2854331 | 6/1979 | Fed. Rep. of Germany . |
| 1239520 | 7/1971 | United Kingdom . |

Primary Examiner—George L. Walton
Attorney, Agent, or Firm—Stevens, Davis, Miller & Mosher

[57] ABSTRACT

The drive shaft is formed with a longitudinally extending groove and the wall of a blind bore formed in the valve disc for receiving the shaft is formed with a projection which fits in the groove by a punching operation. The mating parts are readily made by conventional metal forming techniques and there is no need to pierce the disc.

6 Claims, 3 Drawing Sheets

METHOD OF ATTACHING A VALVE DISC TO A DRIVE SHAFT

This invention relates to a method of attaching a valve disc, particularly of a butterfly valve, to a drive shaft.

In known forms of butterfly valves the disc is cast to its general shape and then a diametrically arranged bore is formed by drilling. This bore receives a drive shaft by means of which the disc is rotated to open or close the valve. To prevent the shaft rotating in the bore one or more pins are provided radially with respect to the shaft axis and inserted through holes in the disc into blind apertures in the shaft.

However it has been found that sometimes the joint between a pin and the disc is not properly formed or becomes damaged and leakage occurs either through the disc from one side to the other or from the interior to the exterior of the valve along a leakage path alongside the drive shaft.

One way of avoiding piercing the disc is to use a shaft of non-circular cross-section e.g. square, in a correspondingly shaped bore. However, such bore shapes are relatively difficult and expensive to provide in practice with the required degree of accuracy by relatively simple machining techniques.

It is an object of the present invention to provide a method of attaching a disc to a shaft by a relatively inexpensive and simple means without providing a leakage path.

In accordance with the invention a method of attaching a valve disc to a circular cross-section drive shaft comprises forming the shaft with a recess on its curved surface, forming the disc to have a bore for receiving the shaft, forming a projection on the interior surface of the bore without piercing the exterior surface of the valve disc and placing the shaft in the bore so that the projection fits tightly into the recess and thereby allows the disc to be rotated on rotation of the shaft.

Preferably the recess in the shaft comprises a longitudinal generally rectangular cross-section groove and is formed by a machine operation.

Preferably also the method of forming the projection comprises placing a supporting arbor having a recess inside the bore, the recess abutting the interior curved surface of the bore, placing a punch or other suitable forming tool on the outside surface of the disc adjacent the bore and recess, and applying an impulsive force to the punch, thereby shaping the metal of the disc to form the said protection. The shaping shears some of the metal of the disc and a hollow is formed where the punch contacts the disc surface. In order to give a smooth surface on the metal a weld can be applied along the edge of the hollow so formed.

According to another aspect of the invention a valve comprises a circular cross-section drive shaft provided with a recess on its curved surface and a valve disc having a bore into which the drive shaft fits, a projection being provided on the interior surface of the bore and engaging tightly in the recess in the shaft.

One embodiment of the invention will now be described by way of example only, with reference to the accompanying drawings of which:

Figure 1:
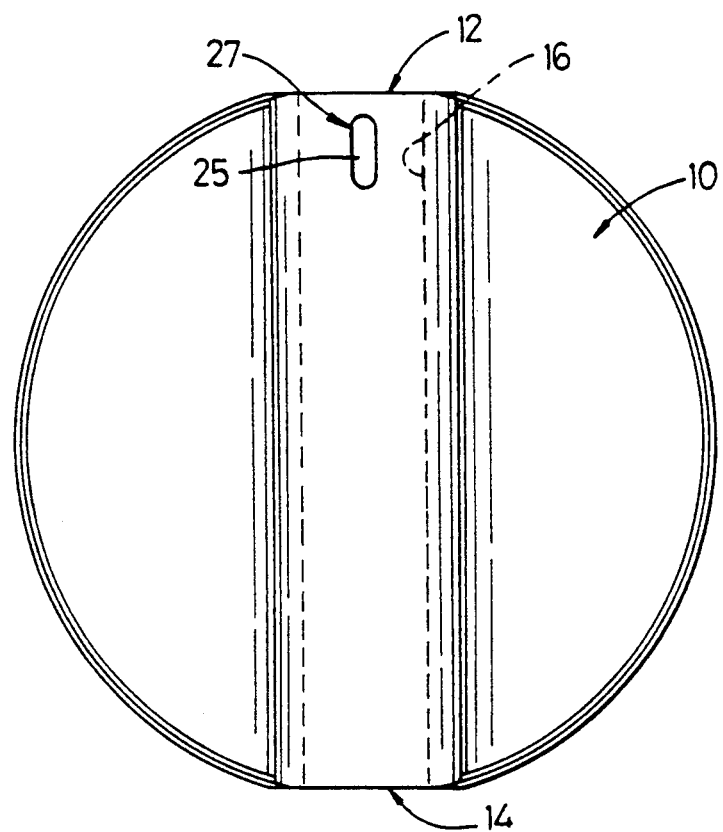
FIG. 1 shows a side view of a butterfly valve disc.
Figure 2A:
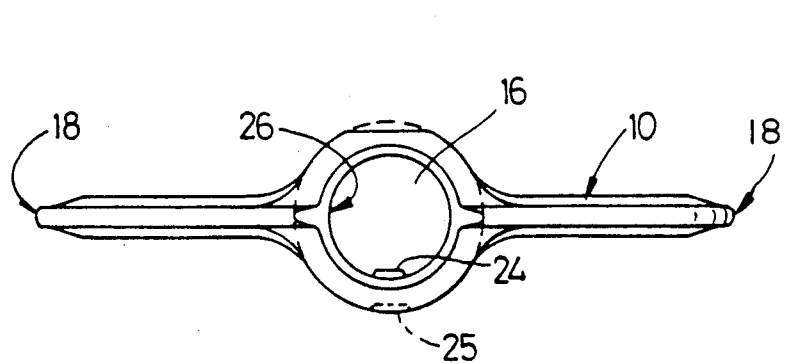
FIG. 2 shows a plan view of the valve disc shown in FIG. 1.
Figure 2B:
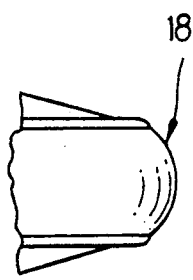

As shown in FIG. 1, the valve disc 10 comprises a generally circular plate having two flat surfaces 12, 14 formed at the top and bottom thereof, a circular bore 16 passing diametrically across the plate and joining the two flat surfaces, the edge of the disc being formed with a curved outer periphery 18 to provide a seal with a seat on the inside of the valve body (not shown).

The valve disc is formed by casting or forging operations and then the diametric bore 16 is accurately formed by drilling. Similarly, the flat surfaces 12, 14 and the shape of the disc periphery 18 are formed accurately by known machining operations.

Figure 3A:
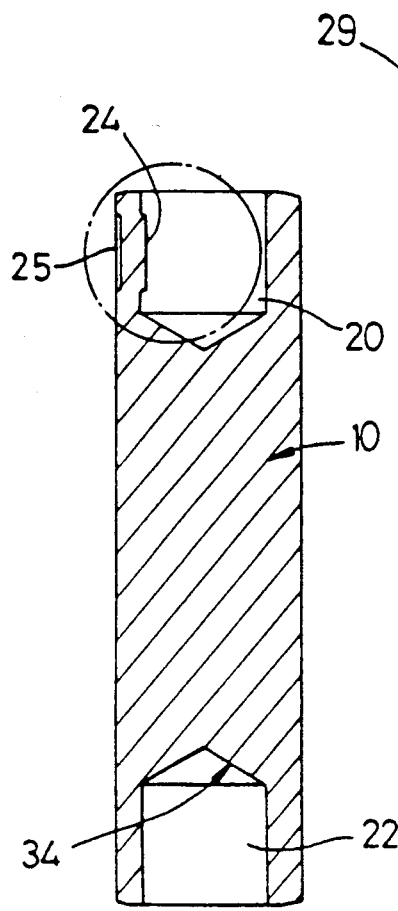
FIG. 3 shows a cross-sectional view through a modified form of the disc shown in FIG. 1.
Figure 3B:
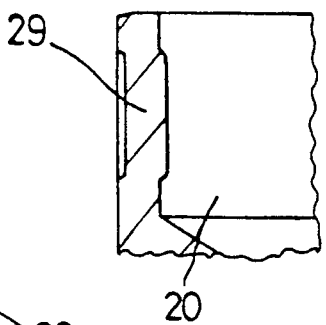

As shown in FIG. 3, a modified form of the valve disc comprises two diametrically opposed bores 20, 22 instead of the one bore 16 shown in FIG. 1 extending across the whole diameter of the disc 10.

Figure 4:
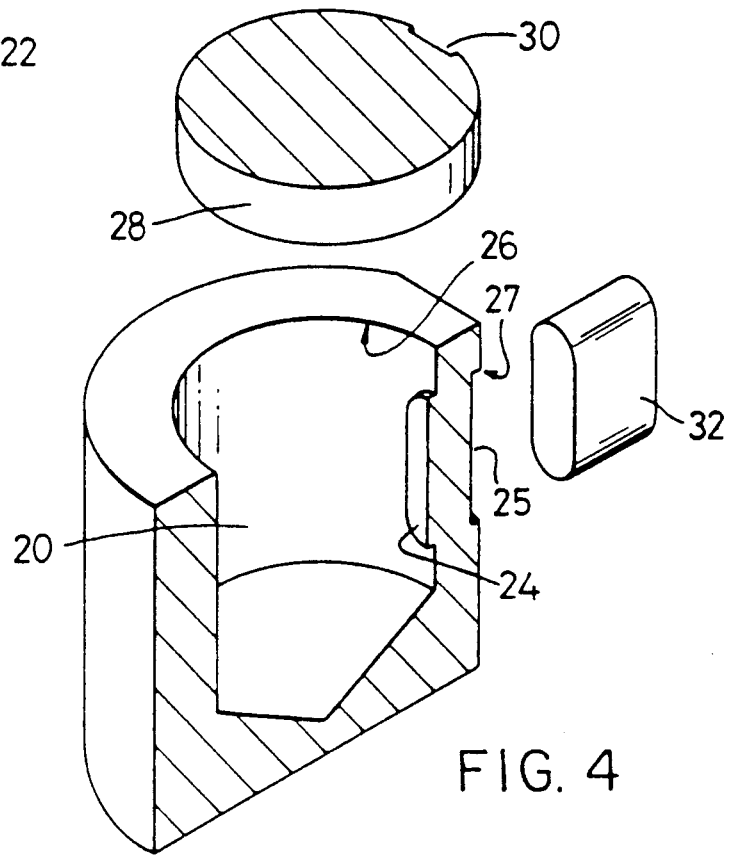
FIG. 4 shows a general perspective view of the upper part of the valve disc shown in FIG. 3, together with a support arbor and projection-forming punch.
Figure 5:
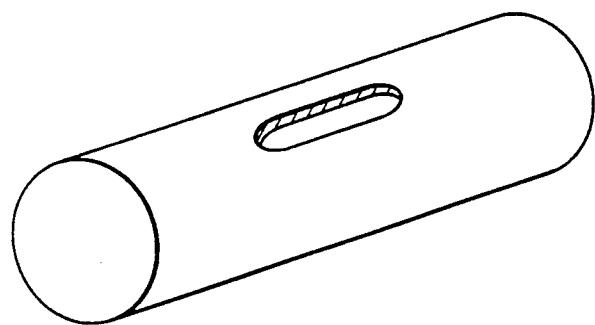
FIG. 5 is a perspective view showing the shaft with recess therein.

Both forms of disc have a projection 24 formed on the interior curved surface 26 of the bore 16 or 20 by placing a support arbor 28 as shown particularly in FIG. 4 inside the bore 16 or 20. The support arbor 28 is generally cylindrical and has an external diameter which is the same as the interior diameter of the bore 16 or 20. The support arbor is formed with a shallow rectangular groove 30 which abuts against the interior curved surface 26 of the bore. When the support arbor is in position a punch 32 or similar tool having a generally rectangular cross-section but with semi-circular ends as shown is placed against the exterior surface of the disc opposite the groove 30 in the support arbor 28 and an impulsive force applied to the punch. This causes the metal of the disc to be sheared and deformed (at 29) to have the shape shown particularly in FIG. 4. The support arbor 28 is removed and a drive shaft (not shown) having a generally circular cross-section matching that of the bore but formed by machining with a shallow rectangular groove similar to that of the rectangular groove 30 in the support arbor is positioned in the bore 16 or 20. The hollow 25 formed on the outside of the bore may be filled in by welding around the edges at 27 to give a smooth surface.

If the disc is of the form shown in FIG. 1 the shaft extends across the whole circumference of the disc and its lower end seats on a suitable bearing surface (not shown). The upper end extends upwardly to the exterior of the valve through appropriate seals and a handle is attached so that rotation of the shaft causes rotation of the disc and thus opens or closes the valve as appropriate.

If however the disc has the form as shown in FIG. 3, two shafts are provided. The lower shaft extends upwards from the body of the valve and seats against a conical surface 34 in the base of the bore 22 on the lower side of the disc. The lower shaft is of circular cross-section and the disc 10 can rotate relative to the shaft. An upper shaft having a rectangular groove in its outer surface is placed in the upper bore, the groove mating with the projection 24 formed on the interior curved surface 26. The upper end of the shaft extends to the exterior of the valve and a handle is attached thereto. On applying a rotational force to the handle the drive shaft is rotated and thus rotates the valve disc 10 to open or close the valve as required.

Since the valve disc face is not pierced, there is no danger of leakage occurring, either from one face to the other, or from the face into the bore and thence to the valve exterior.

What I claim is:

1. A method of attaching a valve disc to a circular cross-section drive shaft comprising forming a shaft with a recess on a curved surface of said circular section, forming the disc to have a bore for receiving the shaft therein, forming a projection in the absence of the shaft on the interior surface of the bore by deforming an exterior portion of the disc into the bore without piercing the exterior surface of the valve disc and subsequently placing the shaft in the bore so that the projection fits tightly into the recess in the shaft thereby allowing the disc to be rotated on rotation of the shaft.

2. A method according to claim 1 wherein the recess on the shaft comprises a longitudinal generally rectangular cross-section groove.

3. A method according to claim 2 wherein the deforming is accomplished by placing inside the bore a supporting arbor having a groove therein, the groove abutting the interior curved surface of the bore, placing a forming tool on the outside surface of the disc adjacent the groove, and applying an impulsive force to the forming tool, thereby shaping the metal of the disc to forming the said projection as it is deformed into the groove.

4. A method according to claim 1 wherein the recess is formed by a machine operation.

5. A valve disc and shaft combination comprising a valve disc having a bore for receiving a circular cross-section drive shaft, said shaft having a recess on a curved surface of said circular section; said bore having, prior to receiving said shaft, a projection on the interior surface of the bore which is formed in the absence of the shaft by deforming an exterior portion of the disc into the bore without piercing the exterior surface of the disc, said projection being located on the interior surface of the bore in a position for engaging tightly in the recess in the shaft when the shaft is subsequently inserted into the bore to thereby allow the disc to be rotated on rotation of the shaft.

6. A valve disc according to claim 5 wherein the projection is shaped to engage tightly in a longitudinal generally rectangular cross-section groove provided on the curved surface of the drive shaft.

* * * * *